United States Patent [19]

Stemme et al.

[11] 4,201,460

[45] May 6, 1980

[54] MOTOR-DRIVEN STILL CAMERA

[75] Inventors: Otto Stemme; Karl Wagner, both of Munich, Fed. Rep. of Germany

[73] Assignee: AGFA-Gevaert, A.G., Leverkusen, Fed. Rep. of Germany

[21] Appl. No.: 902,095

[22] Filed: May 1, 1978

[30] Foreign Application Priority Data

May 5, 1977 [DE] Fed. Rep. of Germany ....... 2720138

[51] Int. Cl.² .............................................. G03B 1/18
[52] U.S. Cl. .................................... 354/171; 354/173
[58] Field of Search ........................ 354/173, 238, 171

[56] References Cited

U.S. PATENT DOCUMENTS

| | | | |
|---|---|---|---|
| 3,098,418 | 7/1963 | Reiher et al. | 354/173 |
| 3,280,713 | 10/1966 | Goldberg | 354/173 X |
| 3,520,391 | 7/1970 | Graham et al. | 354/173 X |
| 3,813,681 | 5/1974 | Sahara | 354/173 |
| 4,106,041 | 8/1978 | Lange | 354/204 X |

FOREIGN PATENT DOCUMENTS 1064190 4/1967 United Kingdom.

*Primary Examiner*—L. T. Hix
*Assistant Examiner*—Shelley Wade
*Attorney, Agent, or Firm*—Michael J. Striker

[57] ABSTRACT

A motor-driven still camera in which all functions associated with making of an exposure and readying the camera for the next exposure are effected by operation of the motor, and a user need exert only the small force required to close a motor-actuating switch in order to initiate the operation of the camera.

9 Claims, 2 Drawing Figures

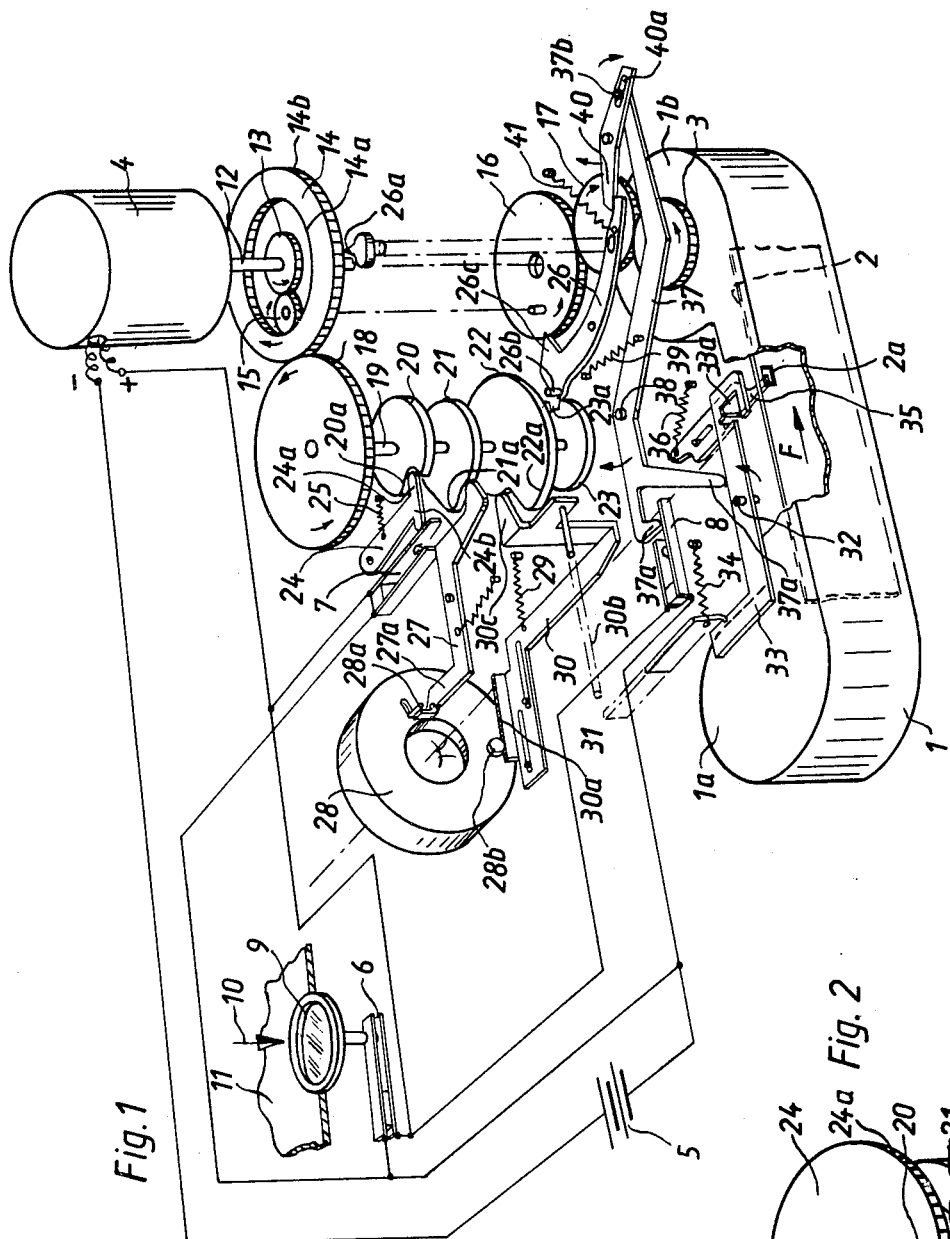
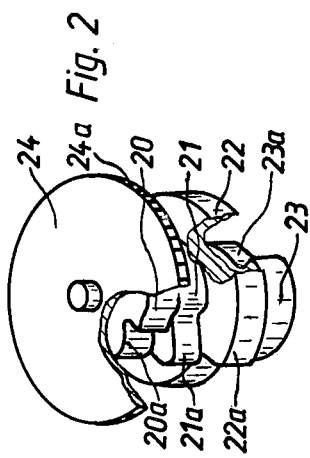
Fig. 1
Fig. 2

MOTOR-DRIVEN STILL CAMERA

BACKGROUND OF THE INVENTION

1. Field of the Invention

The present invention relates to cameras, and more particularly to still cameras.

Still more specifically, the invention relates to motor-driven still cameras.

2. The Prior Art

British Pat. No. 1,064,190 discloses a still camera having a film take-up device and a planetary-gear transmission which is activated by operation of a camera release. The planetary-gear transmission has two output members, one of which is coupled with the film take-up device. A blocking member alternately blocks one and then the other of these output members during operation of the gear transmission. In this patent, therefore, the film advance is power-driven which is a convenience to the user.

SUMMARY OF THE INVENTION

It is an object of the present invention to provide a still camera which provides further improvements beyond those of the prior art.

More particularly, it is an object of the invention to provide a motor-driven still camera which is exceptionally simple and convenient to use.

A concomitant object is to provide a motor-driven still camera in which jarring and vibrations—and their undesirable effects on the quality of an exposure—due to operation of the shutter release, are avoided.

Still a further object is to provide a still camera of the type under discussion wherein film transportation, cocking of the shutter mechanism and triggering of the shutter mechanism, are all power-operated.

In pursuance of these objects, and of others which will become apparent hereafter, one aspect of the invention resides in a motor-driven still camera which, briefly stated, may comprise an electric motor; an electric circuit for supplying energy to the motor; a normally open switch interposed in the circuit and arranged to be operated and complete the circuit in response to actuation of the camera release; and means operatively connected with the motor for operating the shutter and the film transporting mechanism in response to operation of the switch by the camera release.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWING

FIG. 1 is an exploded perspective view, illustrating an exemplary embodiment of the invention; and FIG. 2 is a perspective view, showing a detail of a further embodiment.

DESCRIPTION OF THE PREFERRED EMBODIMENTS

In the FIG. 1 only those elements have been illustrated which are necessary for an understanding of the invention. The housing of the camera is shown only fragmentarily at 11, so as not to interfere with the illustration of other elements. It will have, in the usual manner, a chamber for accommodation of a film cassette 1 which is provided with a supply compartment 1a for film 2, and with a take-up compartment 1b accommodating a (not illustrated) take-up spool onto which the film 2 is wound upon withdrawal from the supply compartment 1a. Externally of the compartment 1b the cassette 1 is provided with a gear 3 which is coupled with the take-up spool to impart rotation to the same. The film 2, which is shown fragmentarily, is provided along one edge with the usual series of perforations 2a (one shown); these perforations are spaced from one another lengthwise of the film 2 by identical distances which each correspond to the length of a film frame. The cassette 1 has the usual film window (not shown) behind which each film frame must pass in order to be exposed.

All camera functions are power-operated, triggered by a user depressing a camera release 9 (button, diaphragm or the like) in the direction of arrow 10.

For this purpose the camera is provided with an electric motor 4 which is connected in circuit with a source 5 of electric energy, i.e., suitable batteries. Interposed in this circuit are three switches 6, 7 and 8 (e.g., microswitches) which are connected in parallel so that the motor 4 will be energized when any one of the three switches is closed, though the other two switches may be open at the same time. The switch 6 is moved to closed position when the release 9 is depressed as indicated by the arrow 10.

Motor 4 has an output shaft 12. A drive gear 13 of a planetary-gear drive is mounted on the shaft 12; it turns in counter-clockwise direction when the motor 4 is energized. Gear 13 is surrounded by a first output gear 14 of the drive, having an inner annulus of gear teeth 14a and an outer annulus of gear teeth 14b. A planet gear 15 meshes with the teeth of gear 13 as well as with those of the annulus 14a; it is turnably mounted on a second output gear 16. The gear 16 meshes with the teeth of an intermediate gear 17 which, in turn, meshes with the film take-up gear 3 on the cassette 1.

The teeth of the external annulus 14b of output gear 14 mesh with a gear 18 which is mounted on a shaft 19 and rotates the same. Also mounted on the shaft 19 for rotation with the same are four cams 20, 21, 22 and 23. The cam 20 is formed in its periphery with a notch or depression 20a. Cam 21 has its periphery provided with a cam 21a. The periphery of cam 22 is shaped as a substantially spirally-shaped track 22a and the periphery of cam 23 is provided with a notch or depression 23a.

When the camera is in its inactive condition (as shown in the drawing) an arm 24a of a substantially T-shaped lever 24 is lodged in the notch 20a of cam 20; a spring 25 tends to permanently maintain the lever 24 in this position. A projection 26c of a lever 26 (to be discussed in detail later) engages the teeth of output gear 16 to block the same against rotation so that no film transport can take place.

If the camera is now to be operated, a user depresses the release 9, thereby closing the switch 6 and energizing motor 4 via the same. Output gear 16 is blocked by lever 26, but gears 13 and 15 will rotate the output gear 14 which, in turn, rotates the gear 18 so that the cams 20–23 turn with the gear 18 in counterclockwise direction. During this rotation the arm 24a of lever 24, which tracks the cam 20, moves out of the notch 20a so that the lever 24 is pivoted until its other arm 24b closes the switch 7. Even if the user now disengages the release 9 in the usual manner, motor 4 will continue to be energized via the switch 7.

Substantially at the same time as cam 20 closes the switch 7 via the lever 24, the lobe 21a of cam 21 temporarily pivots a lever 27—which tracks the cam 21—in clockwise direction so that an arm 27a of this lever triggers the shutter release 28a of the camera shutter 28.

Cam 22 is tracked at its edge 22a by an arm 30c of a slider 30 which is urged into such tracking engagement by a spring 29. The slider 30 has a portion 30a which is configured as a rack and which meshes with a pinion 28a of the shutter 28. When the pinion 28a is turned in clockwise direction it cocks the shutter (known per se); when it turns in opposite direction it merely idles. The edge 22a of cam 22 is so shaped that after the shutter 28 has been triggered by the lever 27, the cam 22 will displace the slider 30 in the direction of arrow 31 so that during this movement the shutter 28 is cocked again (in readiness for the next exposure) by cooperation of the rack portion 30a and the pinion 28b. Approximately at the same time a rod 30b which is carried on and moves with the slider 30, pivots a double-armed lever 33 in counterclockwise direction about a pivot 32 against the force of a spring 34.

The lever 33 has a cut-out 33a which during the counterclockwise pivoting of the lever 33 embraces a feeler 35 whose leading end rests in a film perforation 2a. The engagement of feeler 35 in the cut-out 33a of lever 33 causes the feeler 35 to be withdrawn from the film perforation and to be tilted slightly counter to the film transporting direction F, thus preventing the feeler from re-entering the same perforation and also releasing the film 2 for subsequent transport in the direction of the arrow F. Lever 33 has the additional function, during its counterclockwise pivoting, of engaging an arm 37c of a lever 37, so as to pivot this latter lever 37 about a pivot 38 in clockwise direction counter to a spring 39, until an arm 37a of lever 37 closes the switch 8. This assures that the motor 4 will remain energized (via switch 8) even when switch 7 opens after the shaft 19 has completed one revolution.

The lever 37 is connected to a pivotable lever 40 via a pin-and-slot connection 37b, 40a. When the lever 37 is pivoted in clockwise direction it, in turn, pivots the lever 40 (via the connection 37b, 40a) in clockwise direction. In so doing the end of lever 40 which heretofore was in engagement with the lever 26, becomes disengaged (withdrawn) from the same. Since the lever 26 is permanently biased by the spring 41 it pivots in counterclockwise direction as soon as it is permitted to do so by the withdrawal of lever 40. The lever 26 is provided with a blocking tooth 26a and a pin 26b, as shown.

When the shaft 19 completes one revolution the slider 30 returns to the position illustrated in the drawing, and in consequence the lever 33 is released by the rod 30b. However, despite this release the lever 33 cannot return to its original position; it is prevented from doing so by its engagement with the feeler 35 which, due to its slight tilt counter to the film transportation direction F, now has its tip (free end) located laterally of the perforation 2a from which it was withdrawn, i.e., opposite a nonperforated part of film 2, so that it cannot yield (by entering a perforation) to allow the lever 33 to move. The switch 8 is still closed at this time. The pin 26b of the lever 26, however, can now enter into the notch 23a of cam 23 and simultaneously the blocking tooth 26a of lever 26 engages the teeth 14b of gear 14, blocking the same against rotation. The motion of gear 13 is now transmitted via the gear 15 to the output gear 16, and from there via gear 17 to gear 13, thus causing the film 2 to be transported in the direction F and to be taken up in the compartment 1b.

Such film transportation continues for the length of one film frame, i.e., until the perforation 2a associated with the next film frame moves into registry with the free end of feeler 35, so that the feeler can now enter this perforation under the urging of spring 36. This movement of feeler 35 allows the lever 33 to be pivoted clockwise by the spring 34 and to return the lever 37 to the original position of the same. As a result the switch 8 opens and the supply of current to the motor 4 is interrupted. The motor 4 stops almost, but not quite instantaneously. It continues turning just long enough for the film 2 to move the feeler 35 to the illustrated position; in other words: the slight tilt in direction counter to the arrow F which was earlier imparted to the feeler 35, is now eliminated again. The movement of lever 37 back to its original position also causes the lever 40 to pivot in counterclockwise direction and the relatively strong spring 39 overcomes the force of the spring 41, with the result that lever 40 pivots lever 26 in clockwise direction until its projection 26c engages the output gear 16 and blocks it, which at the same time tooth 26a releases the output gear 14 and pin 26b is withdrawn from notch 23a of cam 23.

The camera is now ready for the next exposure.

One of the particular advantages of the inventive arrangement is that a user need exert only a very small force to operate the camera, namely only that force which is required to depress the release 9. This force can be so slight since it only serves to close the switch 6, whereas all other operations, such as triggering of the shutter, are effected by the motor 4. Due to the slight force, reflex movements of a user are avoided so that blurring of the picture resulting from such movements or from vibrations of the camera, are avoided.

The invention is susceptible of various modifications which are intended to be comprehended within the protection sought. For example, two or more of the cams 20-23 could be combined in form of a unitary cam body B, as shown in FIG. 2, Cam lobes could be used instead of cam notches, and vice versa. Instead of notches and lobes, appropriately curved cam tracks could be used to control the various actions. Levers could be replaced with sliders, and vice versa. The shutter could be of the self-cocking type, in which case the rack 30a on slider 30 could be omitted.

While the invention has been illustrated and described as embodied in a motor-driven still camera, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

We claim:

1. In a motor-driven still camera having a camera release, a shutter and a mechanism for transporting film having a perforation for each film frame, a combination comprising an electric motor; an electric circuit for supplying energy to said motor; a first normally open switch interposed in said circuit and arranged to be operated and complete said circuit in response to actuation of the camera release; at least two additional normally open switches also interposed in said circuit and connected in parallel with the first-mentioned switch; and means for operating the shutter and the film transporting mechanism in response to operation of said first switch by the camera release, said means comprising at least three jointly rotatable cams and a gear train having an input member operatively connected with said motor, a first rotatable output member for driving said cams, a second rotatable output member which is drivingly coupled with said film transporting mechanism, first follower means cooperating with a first one of said cams for closing one of said additional switches in response to said rotation, second follower means cooperating with a second one of said cams for triggering the shutter in response to said rotation, and third follower means cooperating with a third one of said cams for closing the other of said additional switches and initiating operation of the film-transporting mechanism.

2. A combination as defined in claim 1, said means further comprising a blocking member movable to and from a position which it assumes upon completion of a full revolution by said cams and in which it blocks rotation of said first output member and permits rotation of said second output member.

3. A combination as defined in claim 2, wherein said gear train is a planetary-gear drive.

4. A combination as defined in claim 2, said means further comprising an additional cam jointly rotatable with said at least three cams, and fourth follower means cooperating with said additional cam and with said blocking member.

5. A combination as defined in claim 1, wherein said cams are unitary with one another.

6. In a motor-driven still camera having a camera release, a shutter and a mechanism for transporting film having a perforation for each film frame, a combination comprising an electric motor; an electric circuit for supplying energy to said motor; a first normally open switch and at least two additional normally open switches connected in parallel with said first switch and all interposed in said circuit and arranged to be operated and complete said circuit in response to actuation of the camera release; and means operatively connected with said motor for operating the shutter and the film transporting mechanism in response to operation of said first switch by the camera release, comprising at least three cams arranged to undergo joint rotation by said motor, first follower means cooperating with a first one of said cams for closing one of said additional switches in response to said rotation, second follower means cooperating with a second one of said cams for triggering the shutter in response to said rotation, third follower means cooperating with a third one of said cams for closing the other of said additional switches and initiating operation of the film-transporting mechanism, a gear train having a first rotatable output member and a second rotatable output member which drives said transporting mechanism, and a blocking member movable to and from a position which it assumes upon completion of a full revolution by said cams and in which it blocks rotation of said first output member and permits rotation of said second output member, said third follower means comprising a slider tracking said third cam and being movable by rotation of the same in one direction and upon completion of a full revolution of said third cam in an opposite direction, and means on said slider for cocking the shutter during said movement in said one direction; a feeler biased for movement toward the film so as to enter the perforation of the respective film frame; and means operatively associated with said feeler and said slider for retracting the feeler from the respective perforation in response to movement of said slider in said one direction.

7. A combination as defined in claim 6, said third follower means further comprising a first and a cooperating second lever connected with said retracting means and adapted, in response to movement of said slider in said one direction, to close said third switch and move said blocking member, respectively.

8. A combination as defined in claim 7, said blocking member including one spring which urges it counter to said position, and said first lever including another spring which is stronger than said one spring and which urges said first lever in a sense in which said first lever biases said cooperating second lever and via the same said blocking member into said position thereof counter to the force of said one spring until said slider substantially completes its movement in said opposite direction.

9. In a motor-driven still camera having a camera release, a shutter and a mechanism for transporting film having a perforation for each film frame, a combination comprising an electric motor; an electric circuit for supplying energy to said motor; a first normally open switch and at least two additional normally open switches connected in parallel with said first switch and all interposed in said circuit and arranged to be operated and complete said circuit in response to actuation of the camera release; and means operatively connected with said motor for operating the shutter and the film transporting mechanism in response to operation of said first switch by the camera release, comprising at least three cams arranged to undergo joint rotation by said motor, first follower means cooperating with a first one of said cams for closing one of said additional switches in response to said rotation, second follower means cooperating with a second one of said cams for triggering the shutter in response to said rotation, third follower means cooperating with a third one of said cams for closing the other of said additional switches and initiating operation of the film-transporting mechanism, a gear train having a first rotatable output member and a second rotatable output member which drives said transporting mechanism, and a blocking member movable to and from a position which it assumes upon completion of a full revolution by said cams and in which it blocks rotation of said first output member and permits rotation of said second output member, said third follower means comprising a member tracking said third cam and being movable by rotation of the same in one direction and upon completion of a full revolution of said third cam in an opposite direction, and means on said member for cocking the shutter during said movement in said one direction; a feeler biased for movement toward the film so as to enter the perforation of the respective film frame; and means operatively associated with said feeler and said member for retracting the feeler from the respective perforation in response to movement of said member in said one direction.

* * * * *